United States Patent [19]

Egawa

[11] Patent Number: 5,264,870
[45] Date of Patent: Nov. 23, 1993

[54] IMAGE FORMING APPARATUS
[75] Inventor: Jiro Egawa, Kanagawa, Japan
[73] Assignee: Kabushiki Kaisha Toshiba, Kawasaki, Japan
[21] Appl. No.: 791,506
[22] Filed: Nov. 14, 1991
[30] Foreign Application Priority Data
Nov. 28, 1990 [JP] Japan .................... 2-323297
[51] Int. Cl.⁵ .............. H04N 1/21; B41J 2/47
[52] U.S. Cl. .................... 346/108; 358/296
[58] Field of Search ............. 346/108, 107 R, 76 L, 346/160; 358/296, 300, 302

[56] References Cited
U.S. PATENT DOCUMENTS

| 4,190,867 | 2/1980 | Ohnishi | 358/296 |
| 4,723,145 | 2/1988 | Takada et al. | |
| 4,734,715 | 3/1988 | Shiraishi | 346/108 |
| 4,833,489 | 5/1989 | Byung-Sik | 346/108 |
| 4,862,196 | 8/1989 | Umeda et al. | 346/108 |

Primary Examiner—Mark J. Reinhart
Attorney, Agent, or Firm—Foley & Lardner

[57] ABSTRACT

An image forming apparatus includes a scanner for scanning a light beam over an image carrier, an image forming unit for forming an image on the image carrier corresponding to the light beam scanned over the image carrier by the scanner and a movable supporting member for supporting an image forming medium and conveying the image forming medium to a position where the image on the image carrier is transferred to the image forming medium. The image forming apparatus further includes a first driver for driving the scanner, a second driver for driving the image carrier and the supporting member, a generator for generating a reference signal, a first controller for controlling the first driver to regulate the scanning speed of the scanner based on the reference signal generated by the generator and a second controller for controlling the second driver to regulate the moving speed of the image carrier and the supporting member based on the reference signal generated by the generator.

15 Claims, 7 Drawing Sheets

IMAGE FORMING APPARATUS

BACKGROUND OF THE INVENTION

1. Field of the Invention

The present invention relates to an image forming apparatus such as a color copier or color laser beam printer.

2. Description of the Related Art

The use of color in image forming apparatus such as copiers or laser beam printers is advancing rapidly. In a color copier, a photosensitive drum as an image carrier and a transferring drum as an image forming medium supporting member which supports the image forming medium are rotated in contact in synchronization. A light beam corresponding to each of the original color images is scanned over the image carrier by means of a scanning device. Thus, a latent image corresponding to each of the original color images is formed on the image carrier. This latent image formed on the image carrier is developed as color toner images by multiple colored developing agents each corresponding to the original color image. Each of these respective color toner images which has been developed is transferred in succession and superimposed one on another on the image forming medium supported on the transferring drum. By this means a toner image corresponding to the original color image is formed and fixed on the image forming medium.

In this type of color image forming apparatus, the color image is formed by the successive superimposition of each of the color toner images on the image forming medium. Therefore, the most important factor is to prevent color slippage.

The image forming apparatus in the prior art is designed to equalize the distance from the exposure position on the image carrier to the transferring position in the direction of rotation and the distance from the leading edge position of the image forming medium to the transferring position in the direction of rotation. Therefore, the formation of the latent image corresponding to each of the colors of the original image is commenced when the leading edge position of the image forming medium on the transferring drum is detected. By this means, the matching between the toner images of each colors is performed.

However, in this type of image forming apparatus, when executing multiple transferring for each color, the leading edge positions of the toner image on the image carrier and of the image forming medium are matched. Then, when executing the image forming process by means of leading edge position matching between the respective color toner images, the rotational drive of the image carrier and the rotational drive of the transferring drum on which the image forming medium is supported and, moreover, the drive of a polygon mirror as the scanning device which scans the light beam over the image carrier are driven asynchronously. Therefore, when phase slippage occurs between the detection signals which detect the leading edge position of the image forming medium and the horizontal synchronization signals for controlling the image forming process, this phase slippage will accumulate during the execution of the image forming processes for multiple colors. The control of the leading edge position matching of the image forming medium will be affected by this. This results in the problem of color slippage occurring in the image on the image forming medium when the images formed on the image carrier are transferred on the image forming medium.

That is, in a prior art image forming apparatus, when executing multiple transferring for each color, the rotational drive of the image carrier and the rotational drive of the tranferring drum and, moreover, the drive of the scanning device which scans the light beam over the image carrier are driven asynchronously. Therefore, phase slippage occurs between the detection signals which detect the leading edge position of the image forming medium and the horizontal synchronization signals for controlling the image forming process. The control of the leading edge position matching of the image forming medium is affected by this. This results in the problem of color slippage occurring in the image on the image forming medium.

SUMMARY OF THE INVENTION

It is an object of the present invention to provide an image forming apparatus which can obtain high-quality color images without color slippage.

According to the present invention there is provided an image forming apparatus comprising means for scanning a light beam over an image carrier, means for forming an image on the image carrier corresponding to the light beam scanned over the image carrier by the scanning means, a movable supporting member for supporting an image forming medium and conveying the image forming medium to a position where the image on the image carrier is transferred to the image forming medium, first driver means for driving the scanning means, second driver means for driving the image carrier and the supporting member, means for generating a reference signal, first control means for controlling the first driver means to regulate the scanning speed of the scanning means based on the reference signal generated by the generating means, and second control means for controlling the second driver means to regulate the moving speed of the image carrier and the supporting member based on the reference signal generated by the generating means.

DETAILED DESCRIPTION OF THE PREFERRED EMBODIMENT

Referring to the accompanying drawings, a detailed description will subsequently be given of the preferred embodiment of the present invention.

Figure 2:
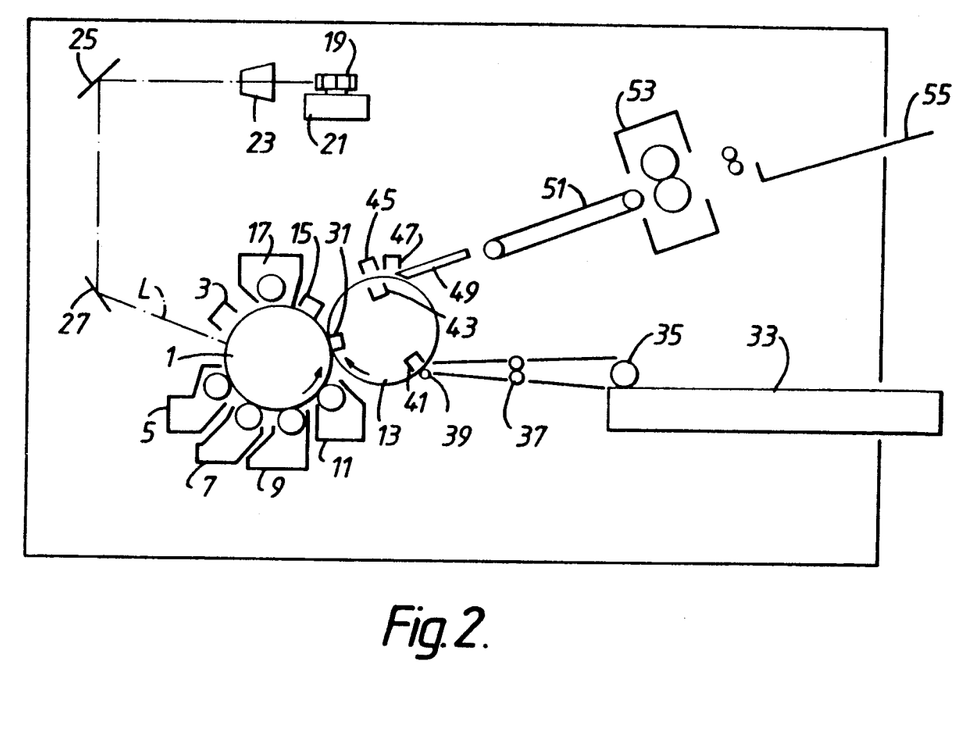
FIG. 2 is a schematic cross-section view of the image forming apparatus of the present invention.

First, a color recording apparatus (laser beam printer), as the image forming apparatus of the present invention, is described with reference to the schematic cross-section view in FIG. 2.

In this apparatus, photosensitive drum 1 is provided as an image carrier which is rotated in the anti-clockwise direction. Main charger 3, first developing device 5, second developing device 7, third developing device 9, fourth developing device 11, transferring drum 13 as an image forming medium supporting member, pre-cleaning discharger 15 and cleaning device 17 are respectively arranged in that order round the periphery of photosensitive drum 1. Furthermore, a scanning unit composed of polygon mirror 19 which scans laser beam L from semiconductor laser 73 (shown in FIG. 1), polygon motor 21 which drives this polygon mirror 19, lens 23 and mirrors 25 and 27 are arranged between main charger 3 and first developing device 5.

First, second, third and fourth developing devices 5, 7, 9 and 11 render the latent images on photosensitive drum 1 corresponding to each respective color visible as toner images. For instance, magenta developing agent (toner) is stored in first developing device 5, cyan in second developing device 7, yellow in third developing device 9 and black in fourth developing device 11. Thus, toner images corresponding to the respective colors are formed by these developing agents. The toner image formed on photosensitive drum 1 are transferred in succession on the image forming medium, which is electrostatically adsorbed to transferring drum 13, by means of transferring charger 31. Any untransferred or remaining toner on photosensitive drum 1 is discharged by pre-cleaning discharger 15, and is then scraped off by cleaning device 17.

The image forming medium is transported by papaer supply roller 35 from cassette 33 in which the image forming medium is stored, and is temporarily positioned by registration roller 37. Then, the image forming medium is transported toward adsorption roller 39 and adsorption charger 41 which are provided to correspond to the adsorption position on transferring drum 13. After this, the image forming medium is electrostatically adsorbed to transferring drum 13 using adsorption charger 41.

After the toner images have been transferred to the image forming medium by the above image forming process, the image forming medium is electrostatically discharged by pre-separation inner discharger 43, pre-separation outer discharger 45 and separation discharger 47. Then, the image forming medium is separated from transferring drum 13 by separator claw 49, and is dispensed into receiving tray 55 via paper transport belt 51 and fixer 53. The toner image is thermally fixed on the image forming medium by fixer 53.

A color image is formed on the image forming medium by the execution of this type of image formation processing.

A detailed description will now be given of the construction relating to the drive control of photosensitive drum 1, transferring drum 13 and polygon mirror 19 in the image forming apparatus shown in FIG. 2, with reference to FIG. 1.

Figure 1:
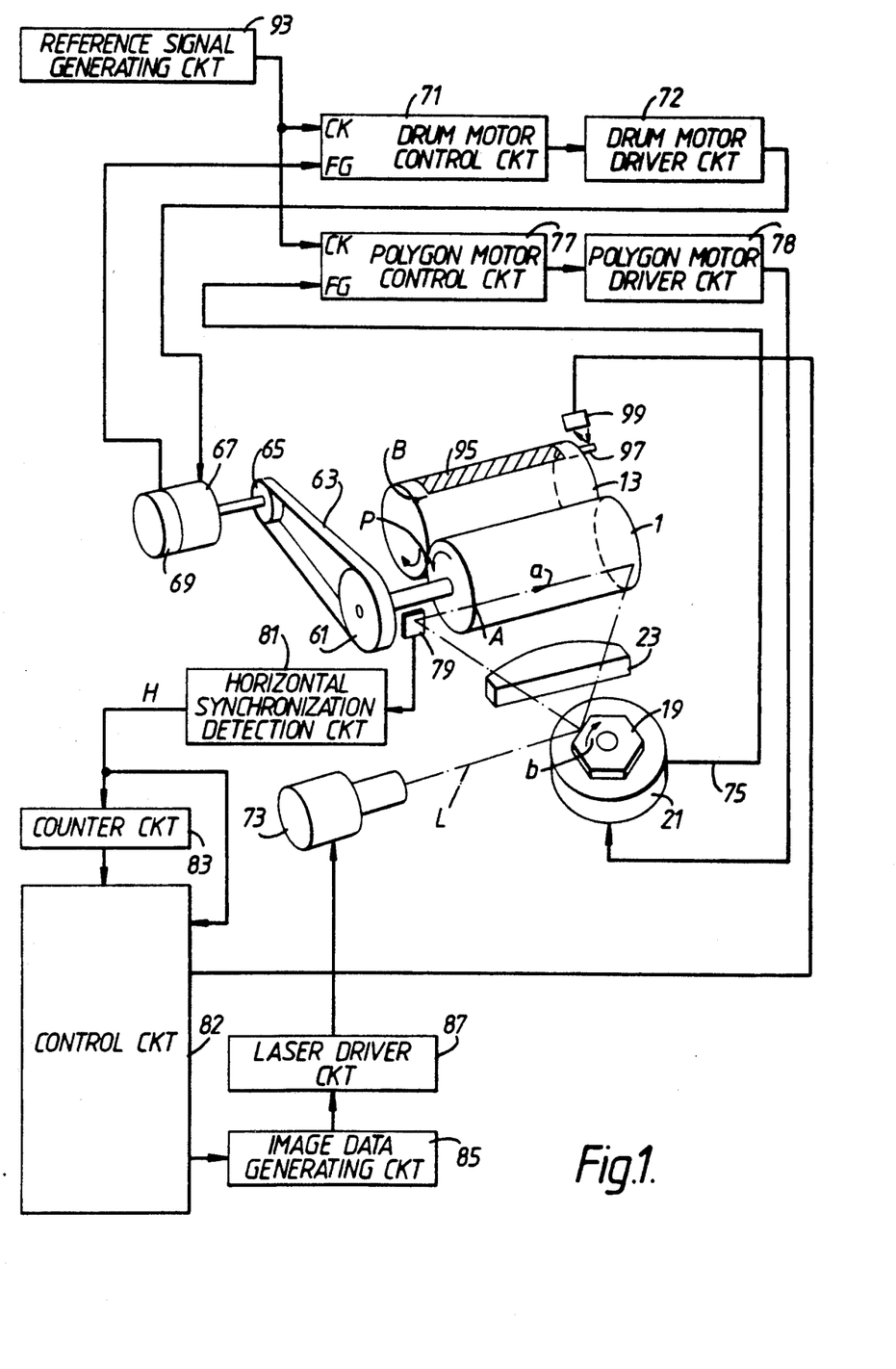
FIG. 1 is a schematic block diagram showing an embodiment of the drive controller applied in an image forming apparatus of the present invention.

In the drive controller of the image forming apparatus shown in FIG. 1, photosensitive drum 1 and transferring drum 13 are linked by gearing (not shown). Also, photosensitive drum 1 is linked to drum motor 67 via pulley 61, belt 63 and pulley 65. That is, synchronization between the driving of photosensitive drum 1 and transferring drum 13 is achieved by the fact that they are mechanically linked. The rotational speed of drum motor 67 is detected by encoder 69 which is incorporated with drum motor 67, and is inputted to drum motor control circuit 71.

Drum motor 67 is driven with a constant current control or constant voltage control by drum motor drive circuit 72, and the rotational speed of drum motor 67 is controlled by drum motor control circuit 71. The well-known PLL (Phase-Locked Loop) control is applied for drum motor control circuit 71.

Semiconductor laser 73, polygon mirror 19 and lens 23 are provided as a scanning unit for scanning laser beam L over photosensitive drum 1. In this scanning unit, laser beam L, which is modulated in response to image signals of the image to be formed and is outputted from semiconductor laser 73, is deflected by polygon mirror 19. Then, laser beam L passes through lens 23 and is scanned in the direction of arrow a over photosensitive drum 1.

The drive controller in this scanning unit is designed so that polygon mirror 19 is rotated in the direction of arrow b by polygon motor 21. FG (Frequency Generator) pulse 75 of polygon motor 21 which is outputted with this rotation is inputted to polygon motor control circuit 77. Polygon motor 21 is driven with a constant current control or constant voltage control by polygon motor drive circuit 78, and the rotational speed of polygon motor 21 is controlled by polygon motor control circuit 77. The well-known PLL (Phase-Locked Loop) control is also applied for polygon motor control circuit 77.

For laser beam L which is scanned over photosensitive drum 1, the scanning beam position on photosensitive drum 1 is detected by beam detector 79. This detection result is binarised by horizontal synchronization detection circuit 81 and is outputted as horizontal synchronization signal H. Horizontal synchronization signal H becomes the reference when executing image formation from a specified position on photosensitive drum 1. Horizontal synchronization signal H is directly inputted to control circuit 82, and it is also inputted to counting circuit 83. Counter circuit 83 counts the horizontal synchronization signal H to reach a specified number (n). Control circuit 82 generates a vertical synchronization signal P based on the count in counter circuit 83 and inputs this vertical synchronization signal P to image data generating circuit 85, which generates image signals in response to image information of the image to be formed. Laser driver circuit 87 current-drives semiconductor laser 73 in response to the image signals generated from image data generating circuit 85 for controlling laser beam L which is outputted from semiconductor laser 73.

Furthermore, in this drive controller, reference signal generating circuit 93 is provided to generate a constant-pulse reference signal in order to exercise synchronous control of the rotational drives relating to photosensitive drum 1, transferring drum 13 and polygon mirror 19.

That is, concerning the rotational drive of photosensitive drum 1 and transferring drum 13 in this drive controller, the control clock of drum motor control circuit 71, which is inputted to drum motor driver circuit 72 which drives drum motor 67 which rotates photosensitive drum 1 and transferring drum 13, is generated in response to a reference signal from reference signal generating circuit 93. Also, concerning the light beam scanning of photosensitive drum 1 (the rotational drive of polygon mirror 19), the control clock from polygon motor control circuit 77, which is inputted to polygon motor driver circuit 78 which drives polygon motor 21, is generated in response to a reference signal from reference signal generating circuit 93 in the same way as for drum motor control circuit 71. Thus, the construction is designed to obtain the execution of synchronized control of the rotational drives of photosensitive drum 1 and transferring drum 13 and the rotational drive of polygon mirror 19.

For color superimposed transferring, position matching of the leading edges of the toner images on photosensitive drum 1 and of the image forming medium, and position matching of the leading edges between each toner image is required. For this purpose, reflector 97 is provided on transferring drum 13 corresponding to leading edge position B of paper 95 which is the image forming medium. Reflector type detector 99 actuates to generate a light beam and receive the reflected light beam. Therefore, when the light beam generated from the detector 99 is reflected by reflector 97, the reflected light beam is received by the detector 99. As a result, the existence of reflector 97 is detected. Thus, the leading edge position of paper 95 on transferring drum 13 is detected. In this case, a distance L1 from exposure position A of photosensitive drum 1 to transferring position P in the rotational direction of photosensitive drum 1, and a distance L2 from leading edge position B of paper 95 to transferring position P in the rotational direction of transferring drum 13 are set to be equal. Also, when the resolutions of primary scanning and secondary scanning are taken as 400 [dots/inch], they become 63.5 [μm/dot]. Therefore, the length of the outer circumference of transferring drum 13 is set to 63.5 [μm]×n (n=an integer).

Figure 3:
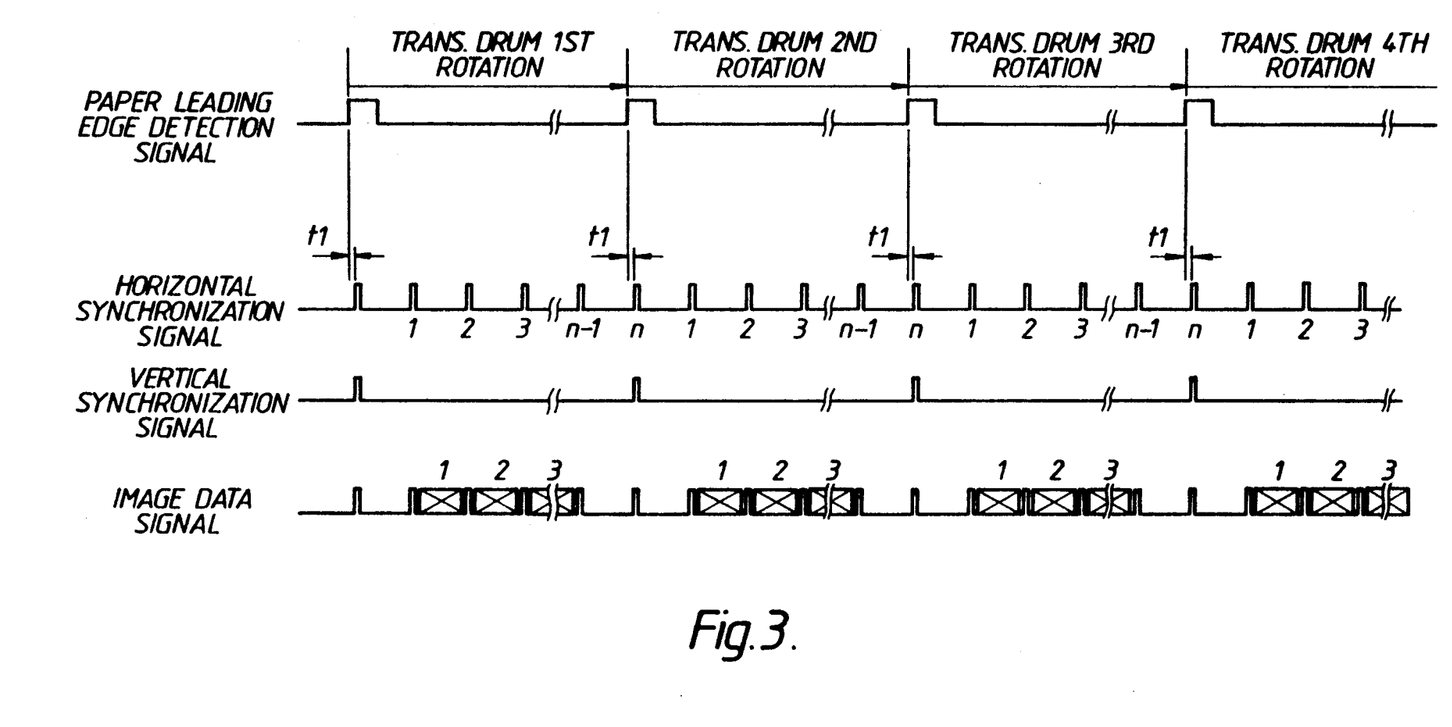
FIGS. 3 and 4 are timing charts to illustrate the operation of the image forming apparatus.
Figure 4A:
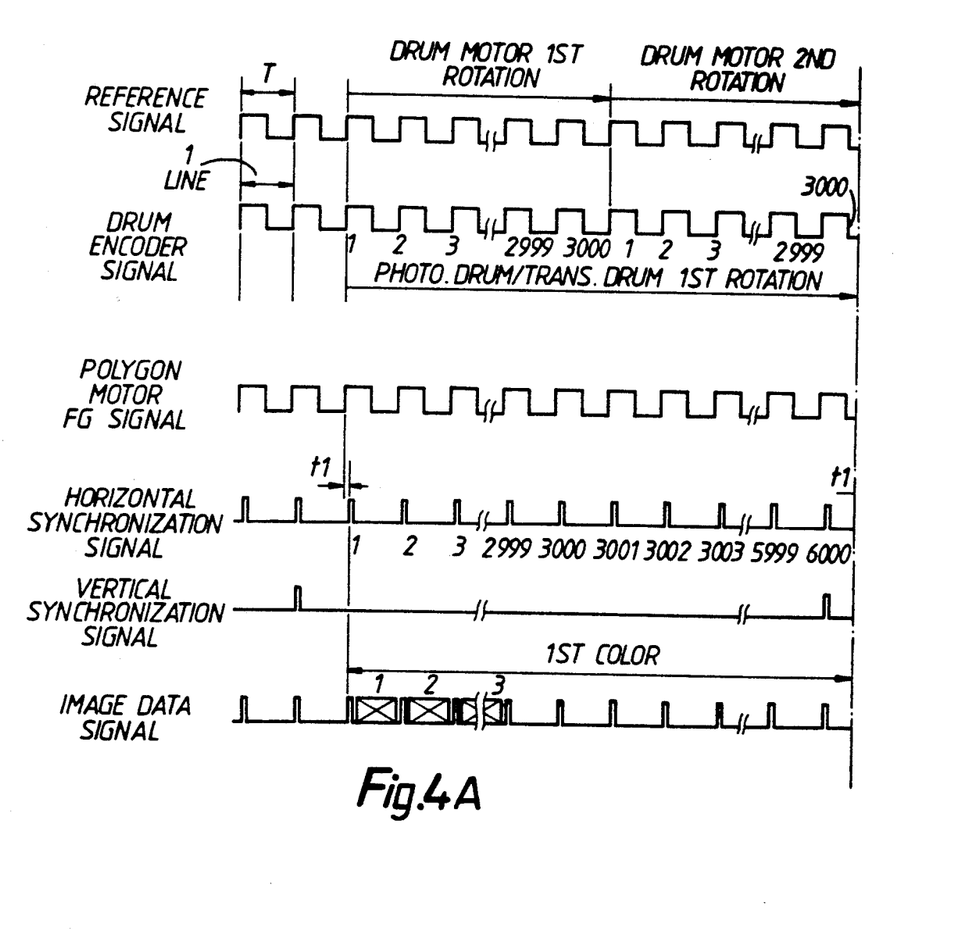
Figure 4B:
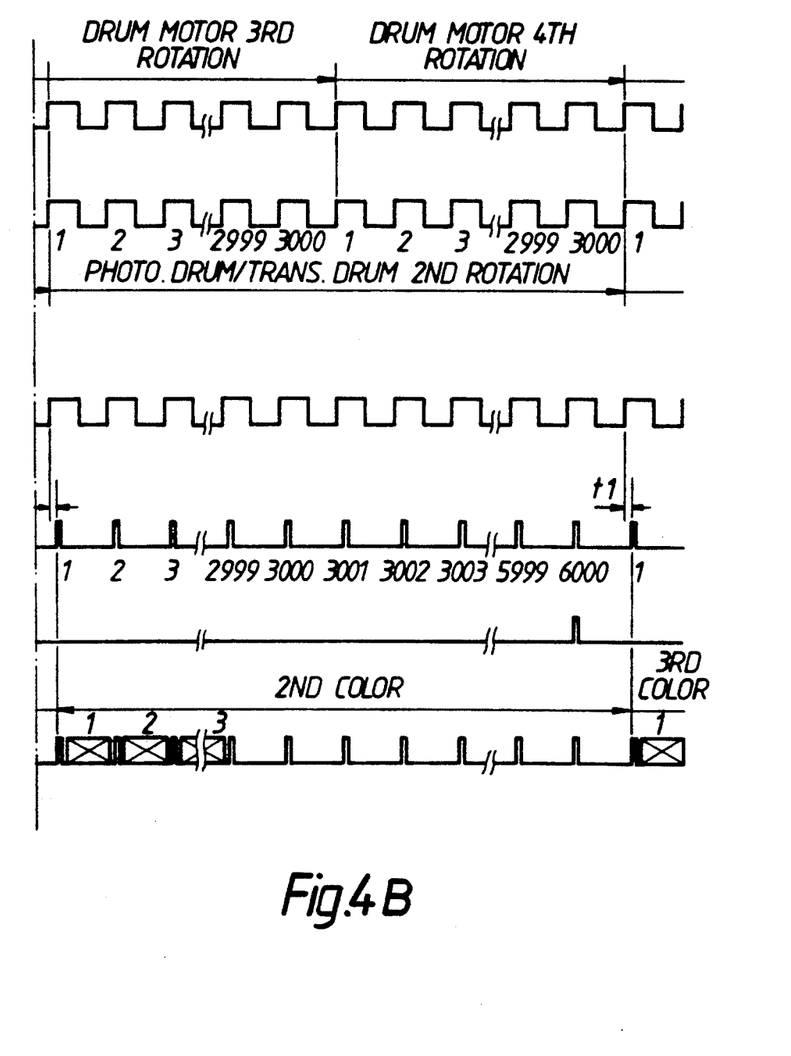

A detailed description of the operation of an image forming apparatus with the above construction will now be given below with reference to the timing-charts in FIGS. 3 and 4.

When leading edge position B of paper 95 is detected by detector 99 through the rotation of transferring drum 13, control circuit 82 outputs the vertical synchronization signal P for the first color to image data generating circuit 85 based on the horizontal synchronization signal H generated at t1 seconds. The latent image for the first color is formed on photosensitive drum 1 by outputting image data signals every line from the following horizontal synchronization signal to laser driver circuit 87. Then, when the latent image for the first color has been formed, and when counting circuit 83 has counted the specified number (n) of horizontal synchronization signals, the vertical synchronization signal for the second color is outputted to image data generating circuit 85 by control circuit 82. In the same way as for latent image formation for the first color, image data generating circuit 85 outputs image data signals to laser driver circuit 87 at every line from the next horizontal synchronization signal. Thus, the latent image for the second color is formed on photosensitive drum 1. Thereafter, control circuit 82 outputs the vertical synchronization signal for the third color and the vertical synchronization signal for the fourth color in the same way when counter circuit 83 counts the specified numbers (n) of horizontal synchronization signals. Thus, the latent image for the third color and the latent image for the fourth color are formed on photosensitive drum 1.

Also, in the image forming apparatus of the present invention which executes this type of image forming process as described above, the rotational drives of photosensitive drum 1, transferring drum 13 and polygon mirror 19 are synchronously controlled by reference signal generating circuit 93. That is, photosensitive drum 1, transferring drum 13 and polygon mirror 19 are synchronously controlled by using control clocks which are supplied commonly to drum motor control circuit 71 and polygon motor control circuit 77.

In the image forming apparatus of the present invention, for instance, as shown in FIG. 1, when the number of faces of polygon mirror 19 is set at 6, the speed of polygon motor 21 is set at N1=20,000 [rpm] and the FG signal of polygon motor 21 is set at 6 [pulses/rotation], secondary scanning becomes 6 [lines] for one rotation of polygon motor 21. In the case of executing PLL control in secondary scanning 1-line units, when the resolution of PLL control is taken as 10 [bits] ($2^{10}=1,024$), clock input CK of polygon motor control circuit 77 becomes (20,000 [rpm]/60)×6×1,024=2,048×10$^6$ [Hz]=2,048 [MHz].

The drum diameter ratio of photosensitive drum 1 and transferring drum 13 is set at 1:1 and the rotational speeds of photosensitive drum 1 and transferring drum 13 are set at N2=20 [rpm]. When the reduction ratio of the transmission composed of pulley 61, belt 63 and pulley 65 which are linked to photosensitive drum 1 from drum motor 67 is also set at 2, the rotational speed of drum motor 67 becomes N3=20 [rpm]×2=40 [rpm].

In the case of executing PLL control in secondary scanning 1-line units, in the same way as for drum motor 67 and polygon motor 21, the encoder pulse of encoder 69 becomes 20,000 [rpm]×6 [lines]/40 [rpm]=3,000 [lines] (pulse/rotation). When taking the resolution of PLL control as 10 [bits] ($2^{10}=1024$), in the same way as for polygon motor 21, clock input CK of drum motor control circuit 71 becomes (40 [rpm]/60)×3,000×1,024=2,048×10$^6$ [Hz]=2,048 [MHz].

As described above, the clock signals of polygon motor control circuit 77 and drum motor control circuit 71 can be used in common. Therefore, as shown in FIG. 4, drum motor 67 and polygon motor 21 will rotate in synchronization with reference signal T outputted from reference signal generating circuit 93. Also, PLL control can be imposed in secondary scanning 1-line units. therefore, high accuracy synchronized control can be executed.

Consequently, for every one rotation of transferring drum 13 and photosensitive drum 1, the position of laser beam L will always pass through the same position. Therefore, slippage in the color overlay of the four colors will not occur.

The reduction ratio of the transmission mechanism, composed of pulley 61, belt 63 and pulley 65, which is linked to photosensitive drum 1 from drum motor 67 is set at 2, and secondary scanning becomes 6,000 [lines] in one rotation of photosensitive drum 1 and transferring drum 13. Thus, a vertical synchronization signal is generated every 6,000 [line] counts for the horizontal synchronization signals, and the first line image data is outputted from the next horizontal synchronization signal. Therefore, there is no slippage of any of the four colors at the image leading edge position, and a high-quality color image without color slippage can be obtained.

Figure 5:
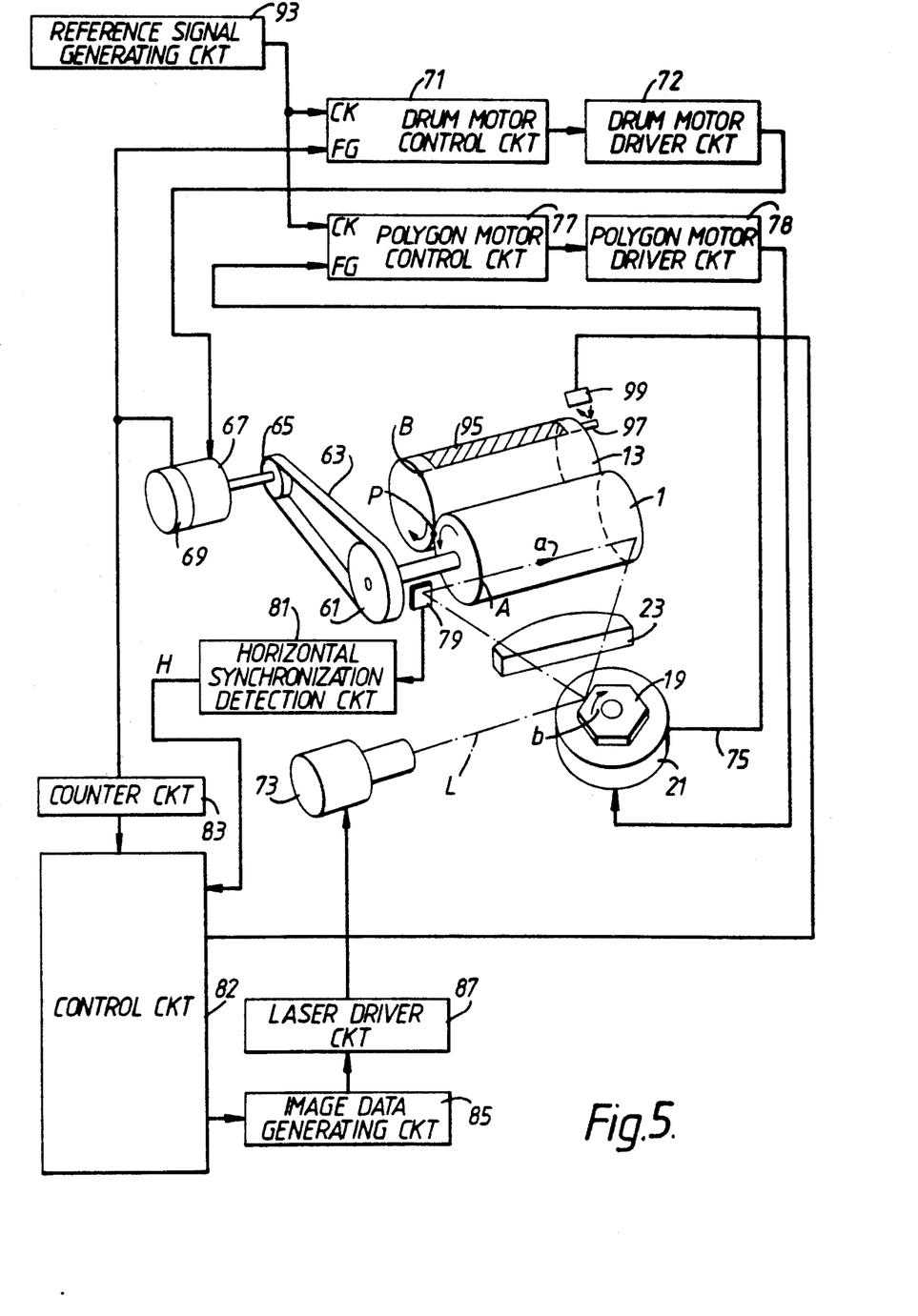
FIG. 5 is a schematic block diagram showing another embodiment of the drive controller applied in the image forming apparatus.

The another embodiment of the image forming apparatus of the present invention will now be described with reference to FIG. 5. The image forming apparatus in FIG. 5 is structurally the same as that shown in FIG. 1. Therefore, the same reference numbers are given to the components, and the description of the construction is omitted.

Figure 6:
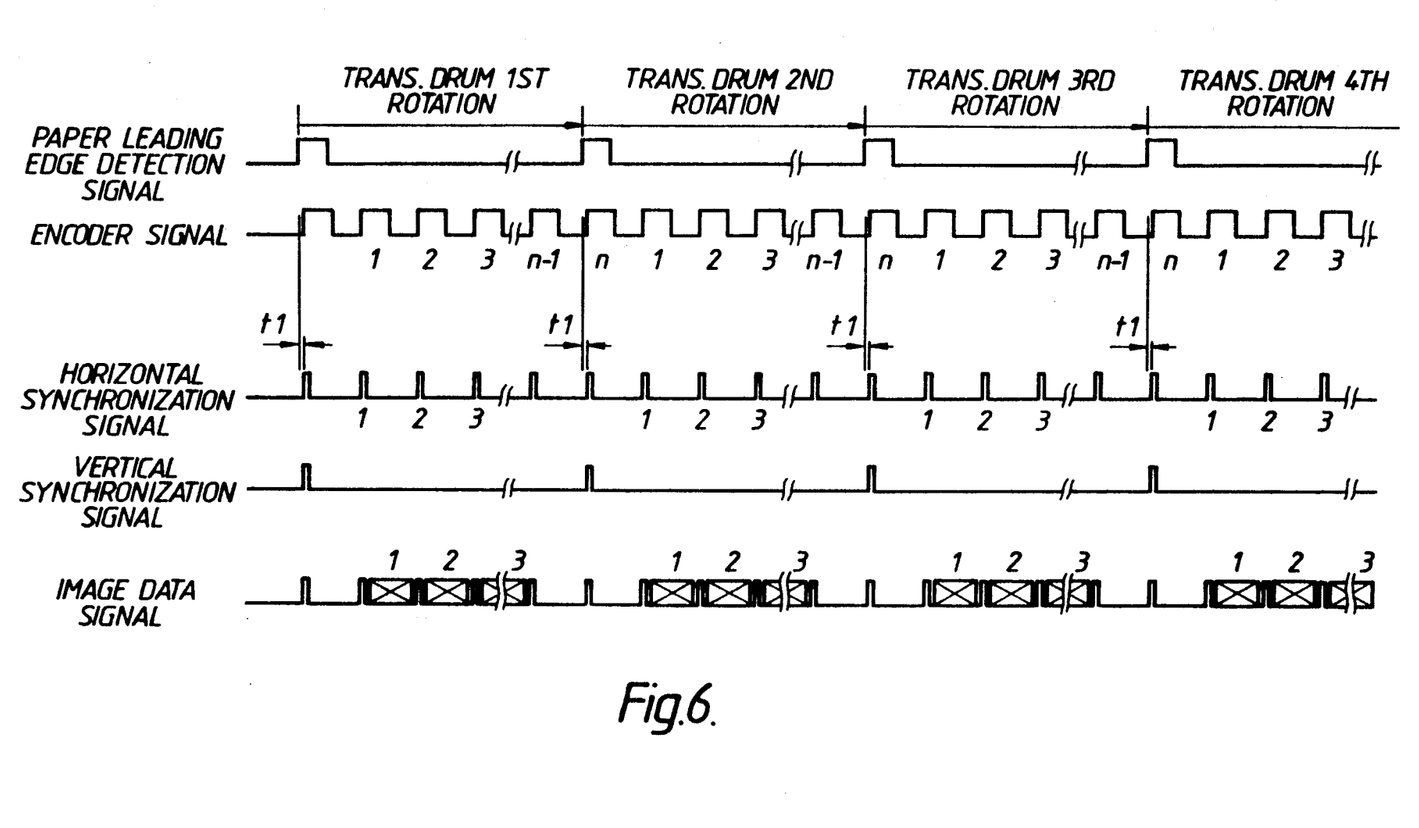
FIG. 6 is a timing chart to illustrate the operation in the drive controller shown in FIG. 5.

The point of difference between the image forming apparatus shown in FIG. 5 and the image forming apparatus shown in FIG. 1 is as follows. In the image forming apparatus shown in FIG. 1, horizontal synchronization signals H from horizontal synchronization signal detection circuit 81 are inputted to counting circuit 83. As opposed to this, in the image informing apparatus shown in FIG. 5, signals from encoder 69 are inputted to counting circuit 83. That is, in the image forming apparatus shown in FIG. 5, encoder 69 detects the rotational speed of drum motor 67 and generates a detection signal. Then the detection signal is inputted to drum motor control circuit 71 and counter circuit 83. Counter circuit 83 counts the encoder signals to reach a specified number (n) and generates a vertical synchronization signal for every one rotation of photosensitive drum 1 and transferring drum 13. That is, in this image forming apparatus, the latent image formation processes are executed in succession from the first color to the fourth color by counting for one rotation of photosensitive drum 1 and transferring drum 13 and generating vertical synchronization signals in response to these count results. FIG. 6 shows a timing chart of the above operation.

In this type of controller, the reduction ratio of the transmission mechanism, composed of pulley 61, belt 63 and pulley 65, which is linked to photosensitive drum 1 from drum motor 67 is set at 2, and secondary scanning becomes 6,000 [lines] in one rotation of photosensitive drum 1. Thus, a vertical synchronization signal is generated every 6,000 line counts for the horizontal synchronization signals, and the first line image data is outputted from the next horizontal synchronization signal. Therefore, there is no slippage of any of the four colors at the image leading edge position. For this reason, the present invention is capable of providing a high-quality image without color slippage of the four colors.

As described above, in the image forming apparatus of the present invention, image formation processing without color slippage is possible, even when executing multiple transferring for each color. Thus, high-quality color images without color slippage can be formed on the image forming medium.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An image forming apparatus, comprising:
   means for scanning a light beam over an image carrier;
   means for forming an image on the image carrier corresponding to the light beam scanned over the image carrier by the scanning means;
   a movable supporting member for supporting an image forming medium and conveying the image forming medium to a position where the image on the image carrier is transferred to the image forming medium;
   first driver means for driving the scanning means;
   second driver means for driving the image carrier and the supporting member;
   means for generating a reference signal;
   first control means for controlling the first driver means to regulate the scanning speed of the scanning means based on the reference signal generated by the generating means; and
   second control means for controlling the second driver means to regulate the moving speed of the image carrier and the supporting member based on the reference signal generated by the generating means.

2. The apparatus of claim 1, further comprising means for mechanically linking the image carrier and the supporting member to synchronize their movement.

3. The apparatus of claim 1, wherein the scanning means includes means for generating a light beam and a polygon mirror for deflecting the light beam from the light beam generating means onto the image carrier; and
   the first driver means includes a motor for rotating the polygon mirror.

4. The apparatus of claim 1, wherein the forming means includes a plurality of developing means each having a color developing agent to form a plurality of image on the image carrier.

5. An image forming apparatus, comprising:
   means for scanning a light beam over an image carrier;
   means for forming an image on the image carrier corresponding to the light beam scanned over the image carrier by the scanning means;
   a movable supporting member for supporting an image forming medium and conveying the image forming medium to a position where the image on the image carrier is transferred to the image forming medium;
   first driver means for driving the scanning means;
   second driver means for driving the image carrier and the supporting member;
   means for generating a reference signal;
   first control means for controlling the first driver means to regulate the scanning speed of the scanning means based on the reference signal generated by the generating means;
   second control means for controlling the second driver means to regulate the moving speed of the image carrier and the supporting member based on the reference signal generated by the generating means;
   means for counting the number of scans of the light beam over the image carrier; and
   third control means for controlling the timing of the image forming by the image forming means in response to the count of the counting means.

6. The apparatus of claim 5, further comprising means for mechanically linking the image carrier and the supporting member to synchronize their movement.

7. The apparatus of claim 5, wherein the scanning means includes means for generating a light beam and a polygon mirror for deflecting the light beam from the light beam generating means onto the image carrier;
   the first driver means includes a motor for rotating the polygon mirror.

8. The apparatus of claim 5, wherein the forming means includes a plurality of developing means each having a color developing agent to form a plurality of image on the image carrier.

9. The apparatus of claim 5, wherein the counting means includes:
   means for detecting the scanning beam position and outputting a detection signal; and
   means for binarising the detection signal received from the detecting means to output a horizontal synchronization signal to be counted.

10. An image forming apparatus, comprising:
    means for scanning a light beam over an image carrier;
    means for forming an image on the image carrier corresponding to the light beam scanned over the image carrier by the scanning means;
    a movable supporting member for supporting an image forming medium and conveying the image forming medium to a position where the image on the image carrier is transferred to the image forming medium;
    first driver means for driving the scanning means;
    second driver means for driving the image carrier and the supporting member;
    first generator means for generating a reference signal;
    first control means for controlling the first driver means to regulate the scanning speed of the scanning means based on the reference signal generated by the first generator means;
    second control means for controlling the second driver means to regulate the moving speed of the image carrier and the supporting member based on the reference signal generated by the first generator means;
    second generator means for generating a specified pulse signals in response to the driving of the image carrier and the supporting member by the second driver means;
    means for counting the pulse signals generated by the second generator means; and
    third control means for controlling the timing of the image forming by the image forming means in response to the count of the counting means.

11. The apparatus of claim 10, further comprising means for mechanically linking the image carrier and the supporting member to synchronize their movement.

12. The apparatus of claim 10, wherein the second driver means includes a first motor for rotating one of the image carrier and the supporting member.

13. The apparatus of claim 10, wherein the scanning means includes means for generating a light beam and a polygon mirror for deflecting the light beam from the light beam generating means onto the image carrier; and
    the first driver means includes a second motor for rotating the polygon mirror.

14. The apparatus of claim 10, wherein the forming means includes a plurality of developing means each having a color developing agent to form a plurality of image on the image carrier.

15. The apparatus of claim 10, wherein the second generator means includes an encoder incorporated with the first motor.

* * * * *